United States Patent [19]
Silvestrini et al.

[11] Patent Number: 5,370,174
[45] Date of Patent: Dec. 6, 1994

[54] METHOD AND APPARATUS FOR AGITATING AND THERMALLY CONDITIONING FILLED CONTAINERS

[75] Inventors: Jesus A. Silvestrini; Juan C. Morsucci, both of Mendoza, Argentina

[73] Assignee: Oak Park International, Ltd., Road Town, Virgin Islands (Br.)

[21] Appl. No.: 17,295

[22] Filed: Jun. 2, 1993

[51] Int. Cl.$^5$ ............................................. F25B 13/00
[52] U.S. Cl. ........................................ 165/2; 165/120;
99/348; 99/360; 426/405; 426/412
[58] Field of Search .................. 99/348, 360; 426/405, 426/412; 165/2, 120

[56] References Cited

U.S. PATENT DOCUMENTS

| | | | |
|---|---|---|---|
| 1,570,235 | 1/1926 | Fooks | 99/366 |
| 3,283,523 | 11/1966 | Long | 62/63 |
| 3,302,423 | 2/1967 | Morrison | 62/380 |
| 3,464,835 | 2/1969 | Castro | 426/412 |
| 3,732,917 | 5/1973 | Deubel | 165/1 |
| 4,384,463 | 5/1983 | Rica et al. | 62/374 |
| 4,385,035 | 5/1983 | Akitoshi et al. | 426/412 |
| 4,437,315 | 3/1984 | Rica et al. | 62/63 |
| 4,505,670 | 3/1985 | Silvestrini et al. | 432/124 |

*Primary Examiner*—A. Michael Chambers
*Attorney, Agent, or Firm*—Pettis & McDonald

[57] ABSTRACT

Apparatus and method are disclosed for agitating and thermally conditioning containers that are carried along a conveyor and engage agitating apparatus in the form of two rollers positioned above the conveyor and adjacent one another and rotatably drive to cause the container to roll against the conveyor and the rollers to effect agitation of the container and the contents while being engaged by a thermal conditioning fluid to effect a temperature change of the container and its contents. One of the two rollers is movable between such a container agitating position and a container passing position that will permit the container to pass over the rollers to move beyond the agitating station and toward an exit from the apparatus.

26 Claims, 7 Drawing Sheets

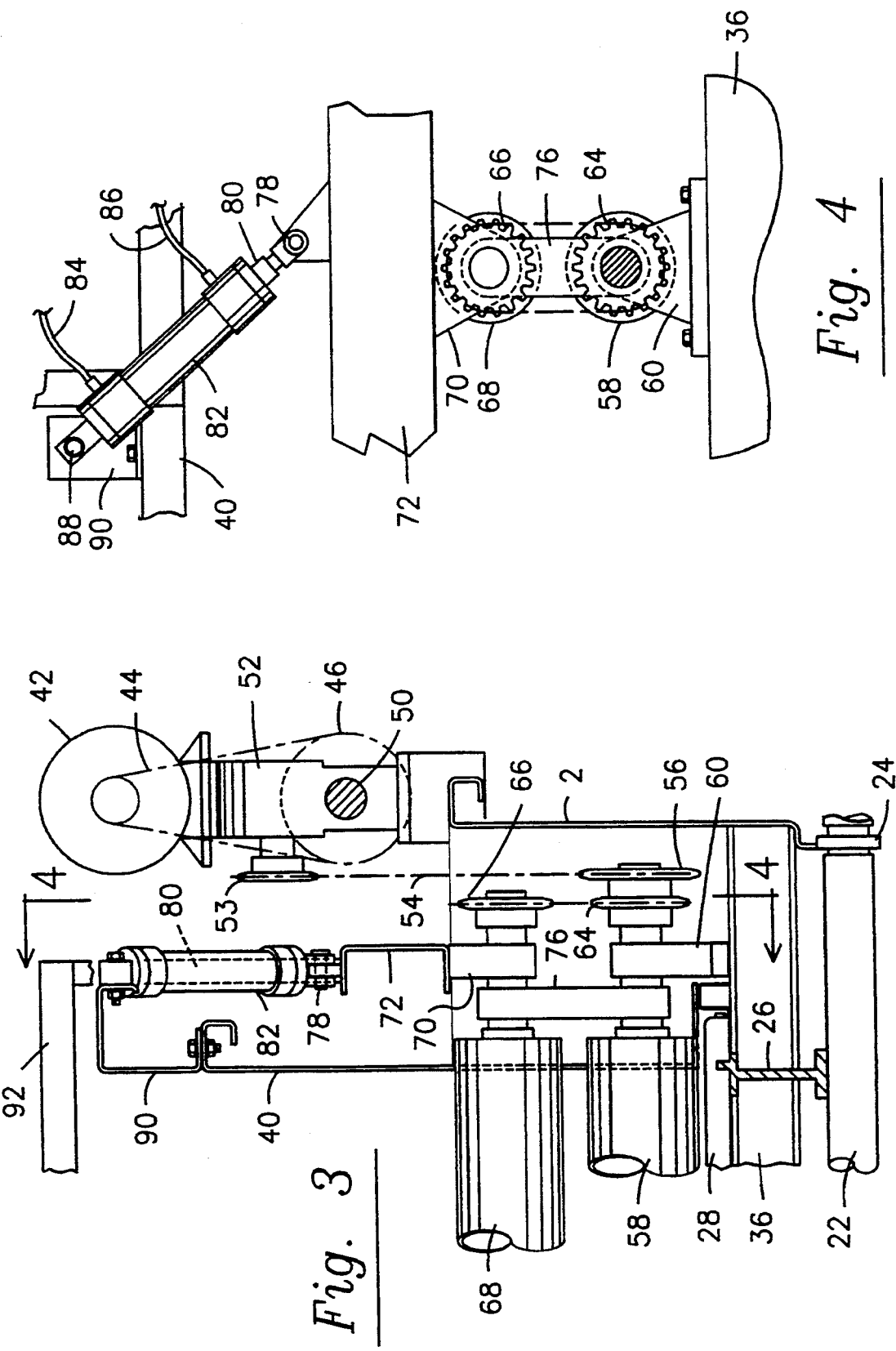

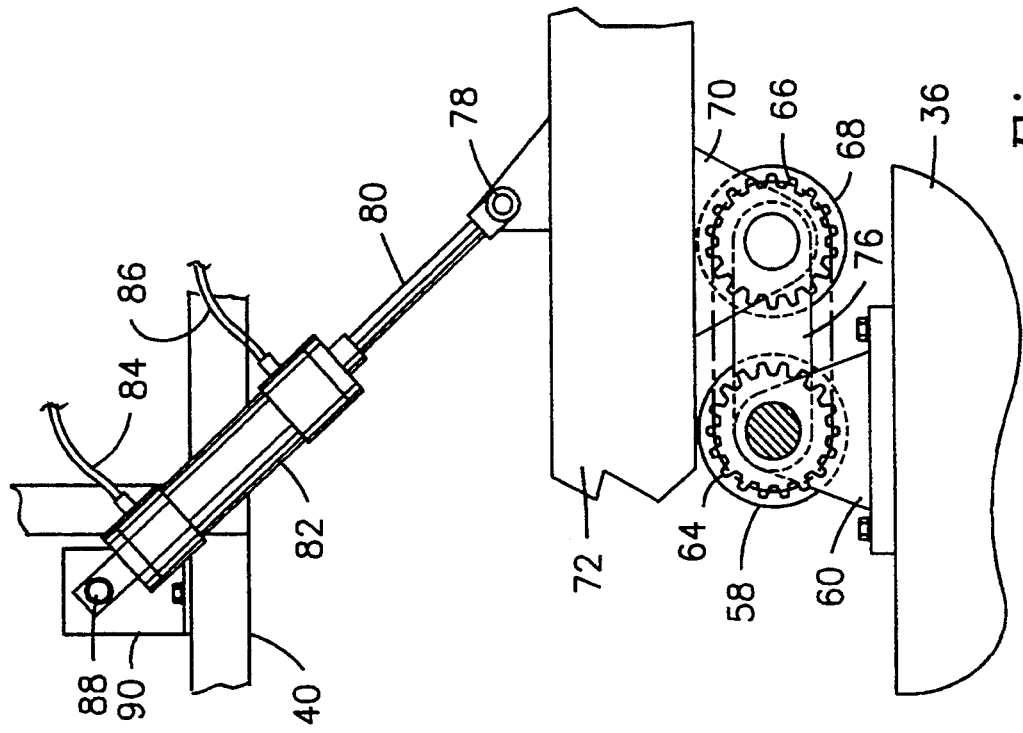
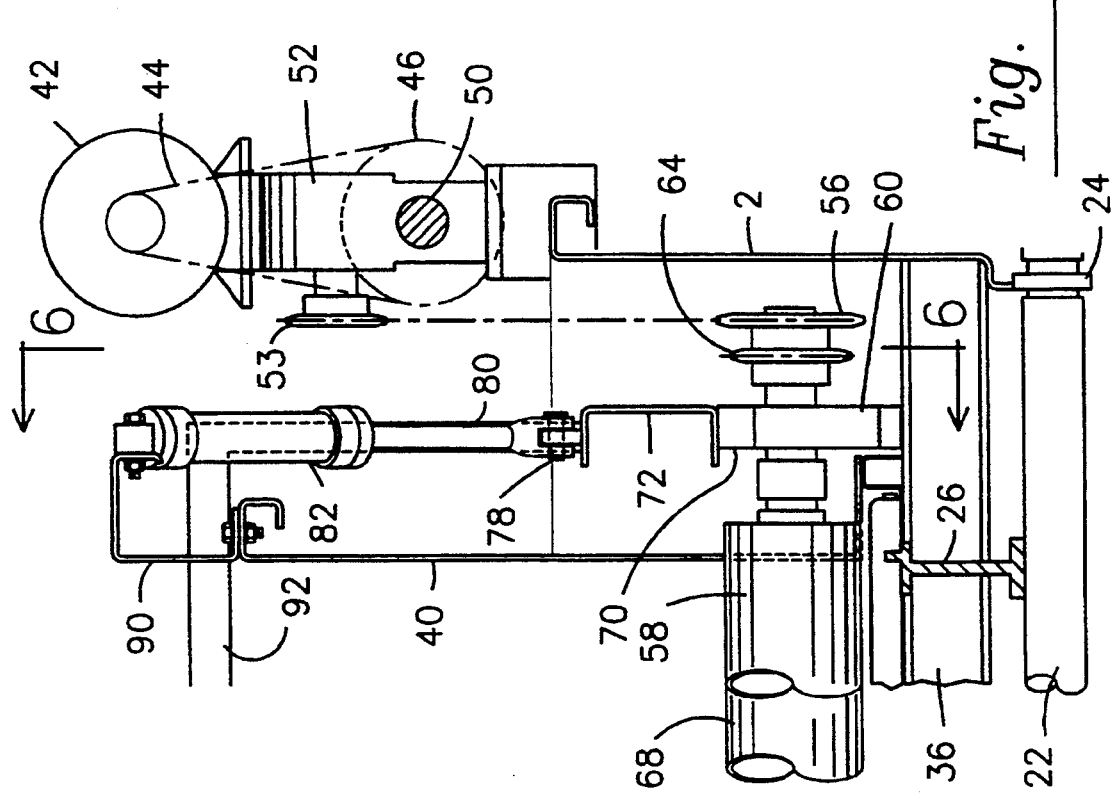

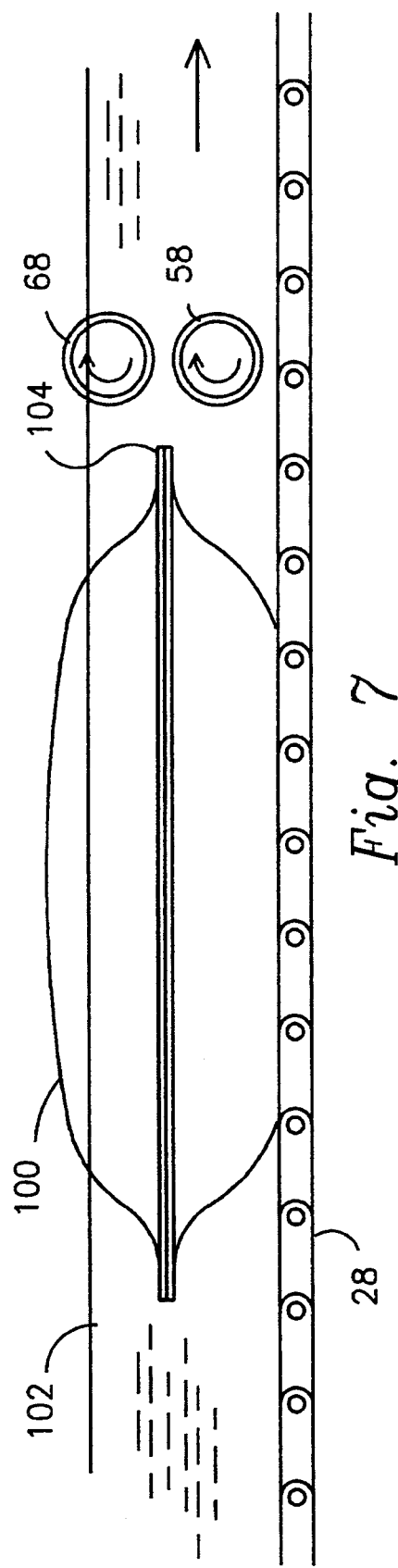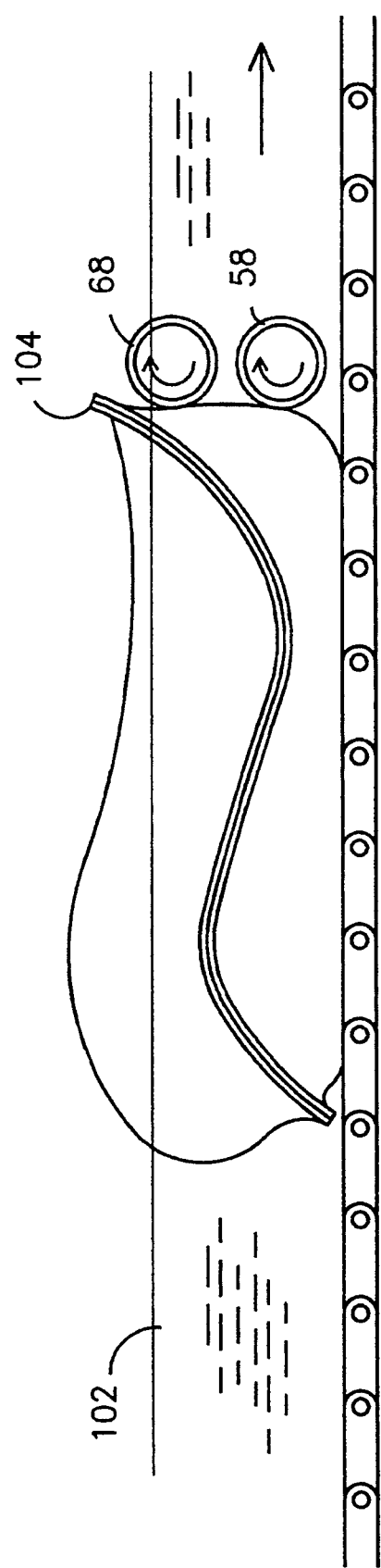

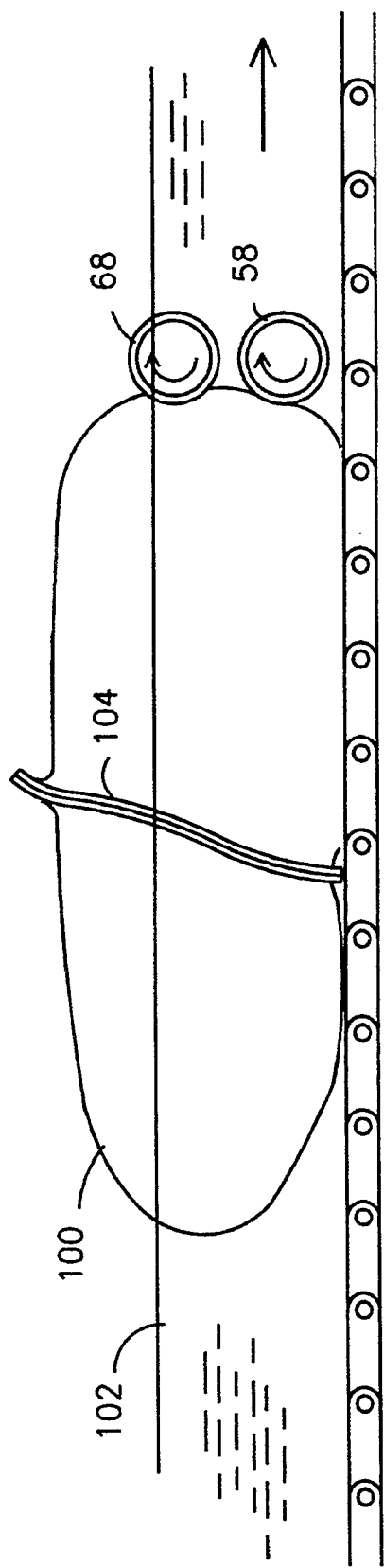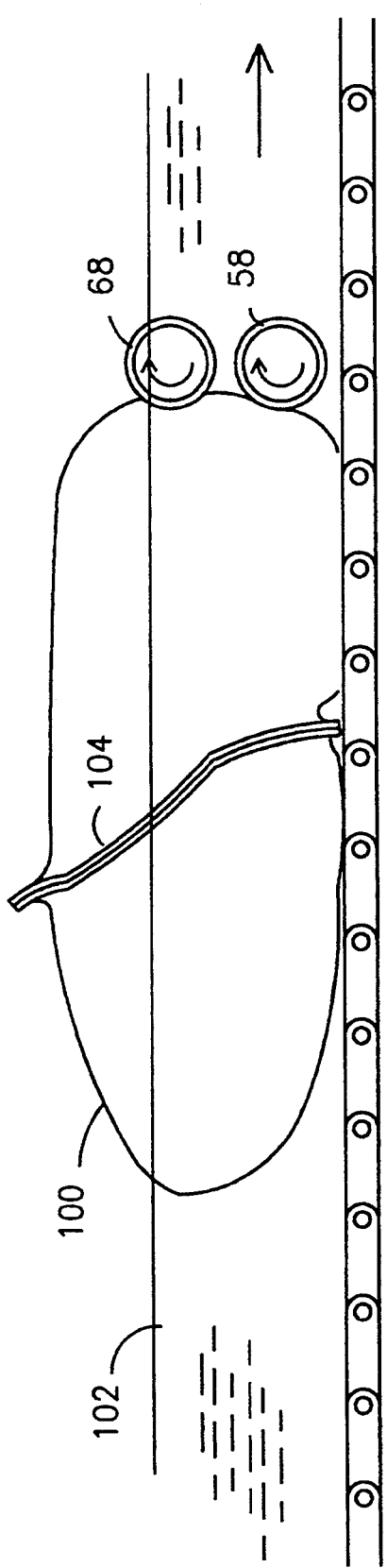

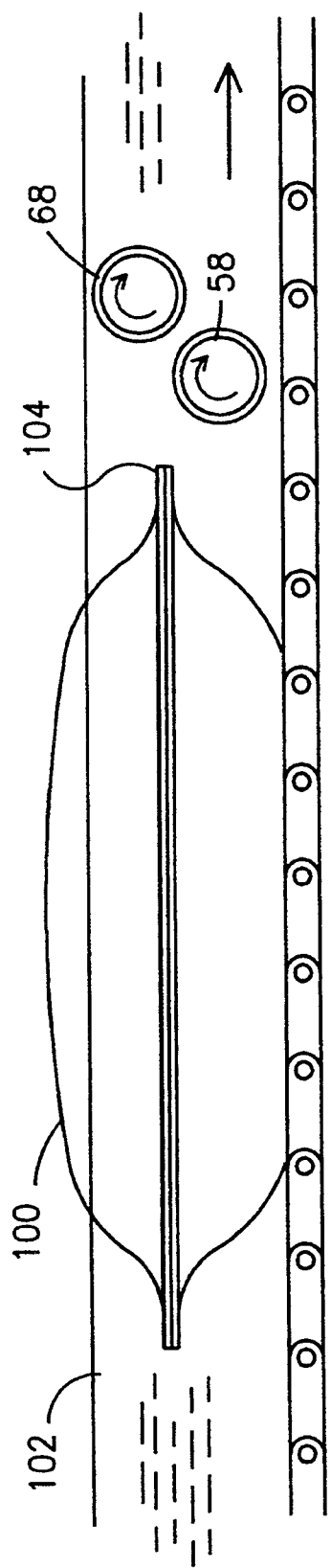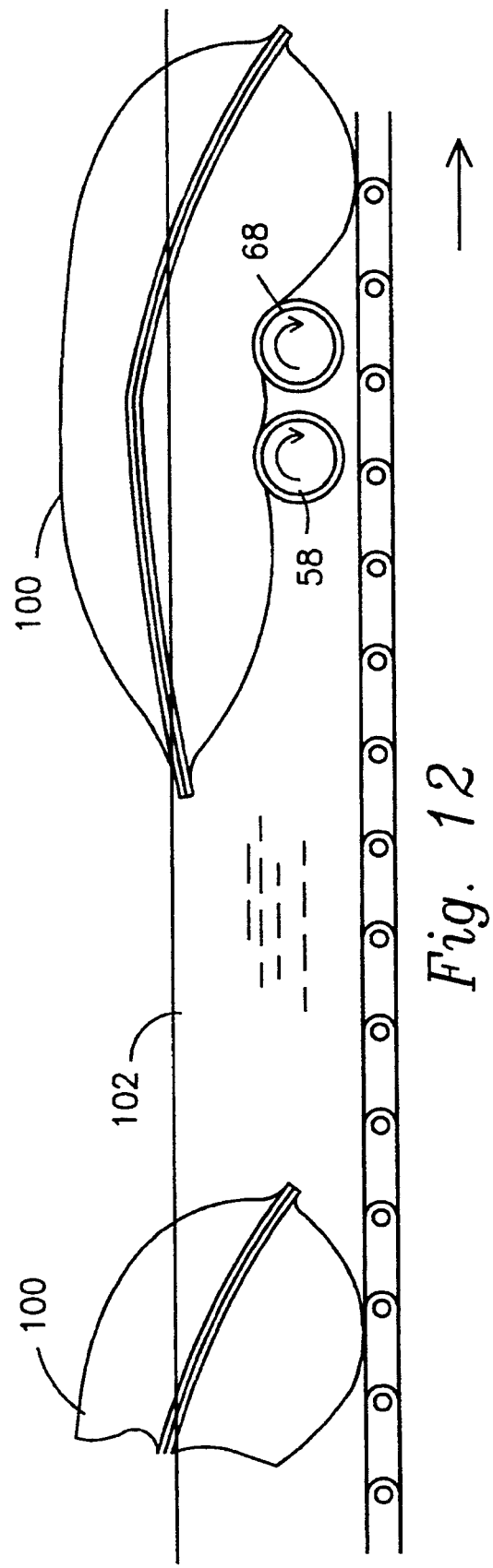
Fig. 11
Fig. 12

METHOD AND APPARATUS FOR AGITATING AND THERMALLY CONDITIONING FILLED CONTAINERS

BACKGROUND OF THE INVENTION

This invention is directed to a method and apparatus for agitating and thermally conditioning filled containers. More specifically, the present invention is directed to an improved method and apparatus for agitating, while either heating or cooling, a filled container.

In the food processing and canning industry there has long been a requirement for heating or cooling the canned product. This requirement exists for bulk packaging of such foods, as in drums of varying sizes and in the more recently developed multi-layer, flexible container, such as those formed in the general shape of a pouch or pillow from multiple layers of material such as plastic sheeting, metallic foil and the like. The thermal conditioning involved may either be heating to assist in sterilizing the interior space and food product held by the container, or cooling for hot-filled containers. More commonly, such containers filled with a heated product are to be cooled for subsequent handling and storage.

Various types of equipment are known and used for such thermal conditioning of cylindrical drums of a predetermined size. However, the nature of that apparatus has required that extensive adjustments be made if containers of significantly different size are to be heated or cooled by that apparatus. Additionally, very little of the prior art apparatus is adapted for use with flexible containers, such as the large pillow or pouch-shaped flexible containers of 50 gallon or greater capacity. These flexible containers are now becoming commonly used by food processing companies in protecting and distributing their products to repackagers who utilize the bulk food product either in making other products or in simply repackaging the product into more easily used cans that are of the sizes conventionally used by consumers. The known apparatus for use with drums or other such cylindrical containers are completely unsuited for use with such flexible containers. Known apparatus for use with such flexible containers has typically incorporated complex, basket-like transports for the containers, which baskets are driven in a rocking motion by a complex mechanical arrangement. Thus, there exists a need for a simple and reliable apparatus for agitating and thermally conditioning filled containers, including such containers as the flexible bags.

SUMMARY OF THE INVENTION

It is an object of the present invention to provide an apparatus for agitating and thermally conditioning filled containers that overcomes the disadvantages of the prior art equipment. It is a further object of the invention to provide such apparatus that is rugged and durable and can provide for substantially continuous operation. It is yet another object of the invention to provide such equipment that is capable of agitating and thermally conditioning flexible, bag-like containers. To achieve the foregoing, as well as other objects that will become apparent to those skilled in the art, there is provided a method and apparatus for agitating and thermally conditioning containers, which apparatus includes an entrance and an exit and at least one agitating station interposed therebetween. The apparatus includes conveying structure for carrying the containers from the entrance to the agitating station and from the agitating station to the exit, thermal conditioning apparatus for changing the temperature of the container and material contained therewithin and agitating apparatus positioned at the agitating station. This agitating apparatus includes at least two rollers positioned above the conveying structure and adjacent one another at the agitating station with the first roller being positioned adjacent the conveying means and the second roller selectively positionable between a container agitating position in which the second roller is positioned above the first roller at a height sufficient to prevent the container from passing over the adjacent first and second rollers and a container passing position in which the height of the second roller above the conveying structure is reduced sufficiently to permit the container to pass over the first roller and the adjacent second roller to permit the container to move beyond the container agitating station toward the exit. The thermal conditioning structure changes the temperature of the container by contacting the container with a thermal conditioning fluid having a temperature substantially different from that of the container when engaged by the conveying means at the apparatus entrance, thus serving to transfer heat between the container and the fluid. The two rollers of the agitating apparatus are rotationally driven in a direction such that the motion of the uppermost portion of each of the roller is in a direction generally the same as the direction of motion of the conveying apparatus, and the first such roller has a diameter substantially less than the total height of the container measured above the conveying structure and is positioned above the conveying structure a height sufficient to prevent the container from passing between the conveying structure and the first roller while permitting the container to pass over the first roller. The second roller, when in the container agitating position, is positioned a height above the conveying structure sufficient to prevent the container from passing over the adjacent first and second rollers so that the action of the conveying structure and the first and second rollers in the agitating position will cause the container to roll against the conveying structure and rollers to effect agitation of the container and its contents.

DESCRIPTION OF THE DRAWINGS

A particularly preferred embodiment of the apparatus of this invention and the method of the invention will be described in detail in connection with the drawings in which:

FIG. 3 is a fragmentary view similar to that of FIG. 2 on a slightly larger scale, illustrating the agitating rollers in their container agitating position;

FIG. 4 is a fragmentary side view of the apparatus of FIG. 3;

FIG. 5 is a fragmentary view similar to that of FIG. 3 but showing the agitating rollers in the container passing position;

FIG. 6 is a fragmentary side view of the apparatus illustrated in FIG. 5;

FIGS. 7–12 are schematic representations of the apparatus of FIG. 1 illustrating the method of operation in which a flexible container is agitated by the agitating means and then passed on to a subsequent position.

DESCRIPTION OF A PREFERRED EMBODIMENT

Figure 1:
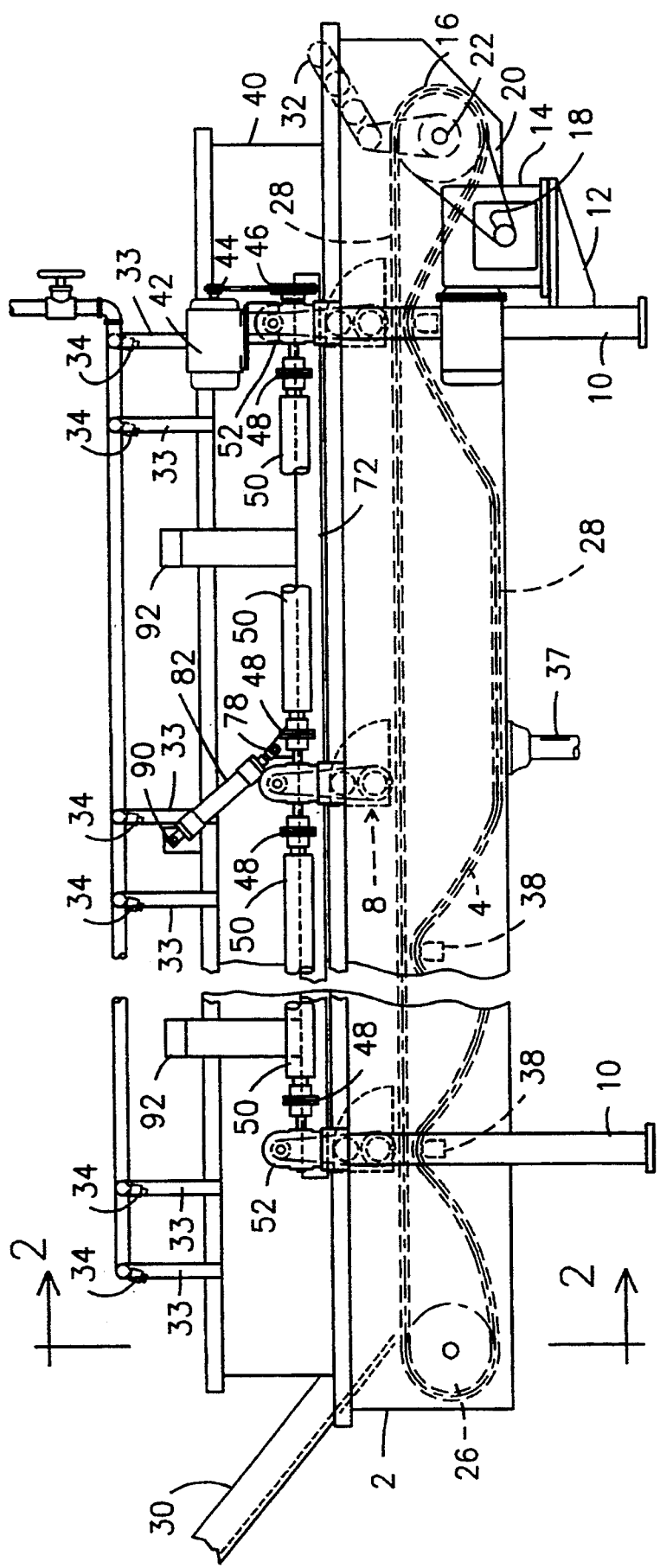
FIG. 1 is a side elevational view of the preferred embodiment of the apparatus of this invention.

A particularly preferred embodiment of the container agitating and thermal conditioning apparatus of the present invention is illustrated in FIGS. 1-6, with certain features of its method of operation illustrated in FIGS. 7-12. The apparatus of this illustrated embodiment comprises, in general, fluid holding means such as a trough-like vat or tank 2 within which is installed conveying means 4, suitably in the forth of a conventional motor driven conveyor chain known to those skilled in the art, thermal conditioning means, generally indicated by reference numeral 6, and at least one, and preferably several, agitating stations 8. The tank 2, formed of any suitable material, such as stainless steel sheet, is supported by a plurality of legs 10 to maintain the tank 2 spaced above the floor of the processing plant. On one of the legs 10 suitably is mounted an appropriate support bracket 12 carrying a conventional motor/gear reducer combination 14. This motor/gear reducer combination 14 rotationally drives a sprocket 16 through a conventional combination of drive sprocket 18 and drive chain 20, although other equivalent drive mechanisms, such as belts, gears, or shafts are equally suitable. The sprocket 16 is affixed to a drive shaft 22 carried by appropriate bearings (not shown) and extends through the tank 2 with suitable water-tight rotary seals 24 permitting such rotation within the tank while preventing leakage of any liquid therefrom. Also carried by shaft 22 are appropriate sprockets 26 that engage and drive the conveying means 4. This conveying means 4 may suitably in the form of an open mesh conveyor chain 28, or linked slats, or any other suitable conveyor structure that provides for the passage of liquid therethrough. The motor/gear reducer combination 14 provides for driving the conveying structure, preferably at a substantially constant speed, in the direction shown by the broken arrow in FIG. 1, that is, with the upper portion of the conveying means moving from left to right in FIG. 1 and moving away from the viewer in FIG. 2.

The entrance into this apparatus is provided with means, which may suitably be a feed chute 30, for delivering containers onto the conveying means and with an exit structure 32, suitably in the form of a plurality of rollers mounted at an angle extending upwardly and away from the conveying means 4 to remove containers from the apparatus. This exit mechanism 32 may suitably be driven by sprockets and chains, or any other conventional drive mechanism, conveniently from the same motor/gear reducer unit 14 as powers the conveying mechanism, thereby maintaining synchronization between the exit or delivery mechanism 32 and the conveying chain 28.

Conventional thermal conditioning means 6 are provided, suitably in the form of a plurality of fluid sprays 34. The nature of the fluid utilized in the sprays 34 may vary, depending upon the nature of the thermal conditioning desired. If, as typically is the case, the goal is to cool containers carrying a heated food product, the sprays from the head 34 would customarily be of cool or chilled water impinging upon the containers and thus cooling the containers. On the other hand, if the goal is to sterilize the containers in this apparatus, the sprays may be either of very hot water or steam, thereby heating the containers upon which they impinge. This thermal conditioning fluid may be provided to the heads 34 through pipe 35 supported above the conveying path by supports 33. After the thermal conditioning fluid has been sprayed onto the containers by the head 34, that fluid may be collected within the tank 2 and returned for cooling and recycling through drain 37.

Supporting the upper portion of the conveyor 28 is a conventional structure 36, which may be in the form of a panel or series of panels or other conventional structure, conveniently supported by the tank 2. This supporting structure 36, shown in FIG. 2, maintains the upper, container supporting, portion of the endless conveyor 28 generally horizontal, as shown in FIG. 1. Fig. 1 also illustrates, in phantom, a plurality of spaced supports 38 for supporting, in a somewhat slack manner, the lower portion of the endless conveyor 28 on its return from right to left in FIG. 1.

In addition to the sides of the tank 2, the structure is also provided with a pair of lateral guides 40 extending longitudinally of the apparatus and positioned laterally inwardly of the edges of the endless conveyor 28. These guides 40 may conveniently be fabricated of sheet metal and serve to guide the movement of containers carried by the conveyor 28.

The agitating means 8 of this apparatus is best shown in Figs. 2-6, although the rotary drive mechanism is best illustrated in FIG. 1. This rotary drive mechanism comprises, generally, drive motor 42, which may conveniently be electric, connected by appropriate belt or chain drive 44 to pulley or sprocket 46. This pulley or sprocket 40 is, in turn, connected through couplings 48 to drive shafts 50, which drive gear transfer units 52 positioned at each agitating station.

Figure 2:
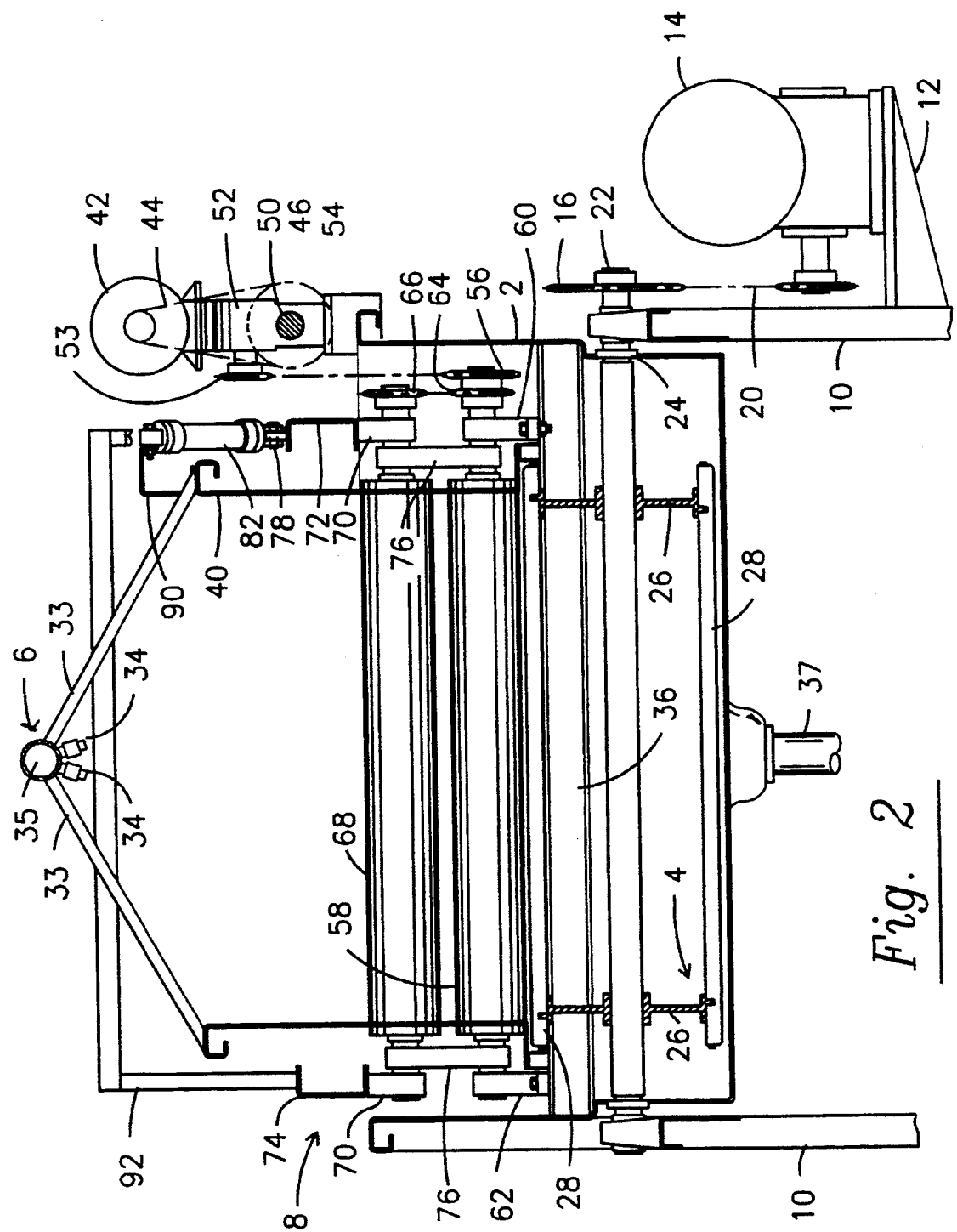
FIG. 2 is an end sectional view of the apparatus of FIG. 1 taken along line 2—2 of FIG. 1.

As shown best in FIG. 2, each of the transfer units 52 provides for a right angle output to sprocket 52 and thus to drive chain 54, which, in turn, drives lower sprocket 56. This sprocket 56 preferably is mounted coaxially to the shaft carrying first roller 58, suitably supported in bearing blocks 60 and 62 at each agitating station. Also mounted to the shaft of first roller 58 is a second drive sprocket 64 which, using conventional means such as a drive chain, rotationally drives upper roller sprocket 66 and thus drives second roller 68 at a speed and direction corresponding to that of first roller 58. The shaft of second roller 68 preferably is also journaled in bearing blocks 70, which are mounted to chassis members 72 and 74 as shown in FIG. 2. The shafts for both the first roller 58 and second roller 68 at each agitating station of this embodiment are also journaled to pivoting linkage members 76, which serve to position rollers 58 and 68 with respect to one another while providing for a pivoting movement of second roller 68 in an arc, suitably about the axis of first roller 58. While it is not necessary that the pivoting movement be about the axis of the first roller 58, it should be at least generally adjacent that axis.

As shown best in FIGS. 2-6, the chassis member 72 is connected by a conventional pivot mount 78 to the shaft 80 of actuating cylinder 82. This cylinder 82 is preferably a double acting cylinder operated either hydraulically or pneumatically by selectively pressurized input and output lines 84 and 86 to effect extension and retraction of the piston shaft 80. The end of cylinder 82 opposite the shaft 80 and its mount 78 preferably are joined through a suitable connection 88 to a mount, such as bracket 90, affixed to the lateral guide members 40 to maintain that upper portion of the cylinder 82 fixed.

At least one and preferably a plurality of connecting brackets 92 extend between chassis members 72 and 74 and are rigidly affixed thereto, such that movement of chassis member 72 under the action of cylinder 82 will directly effect the corresponding movement of chassis member 74 on the opposite side of the apparatus, thereby effecting uniform movement of both ends of the second roller 68 under the influence of the cylinder 82.

Movement of the second roller 68 between one position located generally above roller 58 (FIGS. 3 and 4), and another position generally horizontally spaced from first roller 58 (FIGS. 5 and 6) is effected by extension and contraction of the shaft 80 of the cylinder 82. For reasons to be described below, the first position, as shown ill FIGS. 3 and 4 shall be referred to as the agitating position, and the second position of the roller, illustrated in FIGS. 5 and 6, shall be referred to as the container passing position. The extension of the shaft 80 of cylinder 82 is effected by selective introduction of pressurized fluid selectively into inlet 84 to effect extension of the shaft 80 and then into inlet 86 while exhausting fluid out of inlet 84 to effect retraction of the shaft 80.

The apparatus of a preferred embodiment of this invention having been described above in detail, the method of operation of this invention will now be described in connection with FIGS. 1 through 6 described above and the schematic representations of Figs. 7 through 12. Initially, a container, which could be a rigid cylindrical container or preferably a flexible, pouch-like container, is deposited on the entrance chute 30 after the container has been filled with the desired product, which may conveniently be a food product, such as tomato chunks. The container then slides down the chute 30 onto the conveyor 28, which is positioned within the tank 2. The conveyor then moves the container from the apparatus entrance to a container agitation station 8. While the apparatus of this invention could function with a single such agitating station, it is preferred to have a plurality of such stations in order to increase the throughput of the system.

As shown in FIG. 7, as this container, indicated by reference number 100, approaches the rollers 58 and 68 of the agitating station, it is bathed in sprays of the thermal conditioning fluid 102. In one typical case this will be cooling water sprayed from the nozzles 34 onto the container 100. While satisfactory thermal conditioning can be achieved solely by use of the sprays impinging upon the container, it has been found that even more rapid heat transfer can be effected by maintaining a volume of the heat transfer fluid 102 within the tank 2 sufficient to substantially cover the container when supported on the conveyor 28, as shown in FIG. 5. In this manner heat transfer may occur not only through the spray of the fluid 102 but also by conduction to the surrounding bath of the fluid 102 within the tank 2. That fluid 102 may then be returned through drain 37 to a cooling or heating unit and then supplied again to pipe 35 for reuse, if desired.

As the container 100 is brought into engagement with the rollers 58 and 68, it may be noted that the rollers are being rotationally driven in a direction such that the motion of the uppermost, host portion of each of the rollers is in a direction generally the same as the direction of motion of the conveyor 28. As shown in FIG. 7 the first roller 58 has a diameter substantially less than the total height of the container 100 when measured above the conveying means 28, and that first roller 58 is positioned above the conveyor 28 a height sufficient to prevent the container from passing between the conveyor 28 and the first roller 58. Preferably, the speed of rotation of the rollers 58 and 68 is such that the tangential speed of those rollers is substantially the same as the speed of movement of the conveyor 28.

As shown in FIGS. 7 and 8, as the leading edge 104 of the container 100 engages the rollers 58 and 68 at the agitating station, the movement of those rollers will cause the leading edge of the bag to be lifted. However, as the center of gravity of the container rises, the weight of the container and its contents causes the bag to roll or fold over on itself and effect a rotation of the bag end for end, as is shown more clearly in FIGS. 9 through 11, until the leading edge 104 of the bag has been reversed to the trailing edge position. Such rotation and deformation, and thus agitation of the container and its contents, will continue for any desired length of time, as long as the container 100 engages the rollers 58 and 68 in the vertically spaced configuration shown in FIGS. 7 through 10. This agitation serves to enhance the heat transfer between the thermal conditioning fluid 102 and the container 100 and its contents to effect a more rapid heating or cooling of that container and its contents.

After a predetermined length of time at the agitating station illustrated in FIGS. 7 through 10, the container 100 may then be moved on either to a subsequent agitating station 8, to the container removal rollers 32 to deliver the container from the apparatus, or to any other desired intermediate station. This transfer from the agitating station is effected in the manner shown in FIGS. 11 and 12. In those figures the upper roller 68 is moved from its position generally above roller 58, as illustrated in FIGS. 7 through 10 and also FIGS. 3 and 4, to a position generally horizontally spaced from the first roller 58, as shogun in FIGS. 5, 6 and 12. This movement is effected by the extension of shaft 80 of cylinder 82 urging men, her 72 to the right, as shown in FIG. 6. By virtue of the connection effected by connecting brackets 92 between chassis members 72 and 74, both such chassis men, pets will move together. The movement of these chassis men, bets 72 and 74 is constrained by the pivoting linkage members 76, such that the second roller 68 moves in an arc about the lower pivot axis of those links 76, which axis is generally adjacent the axis of rotation of the first roller 58. Because the first roller 58 has a diameter substantially less than the total height of the container, when roller 68 is moved from its agitating position above roller 58 to its container passing position of FIG. 12, the reduction in height of that second roller 68 is sufficient to permit the container 100 to pass over the first roller 58 and the second roller 68 to be received again onto conveyor 28 for movement beyond that agitating station toward the exit from the apparatus or any intermediate additional station. Once the container 100 has passed fully beyond the rollers 58 and 68, the cylinder 82 may be actuated to retract the shaft 80 to move the second roller 68 back to its agitating position to receive and agitate the next container received on the conveyor 28. As shown in FIG. 1, it is desired to have a plurality of the agitating stations 8 in order that a plurality of containers may be agitated and thermally conditioned at the same time, moving them from station to station.

While operation of the agitating and thermal conditioning apparatus of this invention is illustrated in connection with a flexible pouch-like container, it should be apparent that it could also be utilized in connection with cylindrical drum-like containers, if desired. This apparatus provides for loading and unloading of the containers involved in a continuous manner, utilizing simple and rugged structure to avoid obstructions and breakage of mechanical parts and thus provides a reliable apparatus. Additionally, with respect to flexible containers, the apparatus may be utilized with a plurality of sizes or types of such flexible bags simultaneously, with no adjustment necessary.

While the foregoing describes particularly preferred embodiments of both the apparatus and the method of the present invention, it is to be understood that this description is illustrative only of the principles of this invention and is not to be considered limitative thereof. Accordingly, because numerous variations and modifications of this apparatus and the method of operation, all within the scope of the invention, will readily occur to those skilled in the art, the scope of the invention is to be limited solely by the claims appended hereto.

What is claimed is:

1. A method for agitating and thermally conditioning containers and the contents thereof comprising the steps of
   conveying said containers in a predetermined direction along a path from an entrance, through at least one agitating station and then to an exit therefrom while contacting the container with a thermal conditioning fluid having a temperature substantially different from that of said container when said container is introduced to the entrance of said path, and
   agitating said container by engaging said container on said path by at least two rollers positioned above said path and adjacent one another at an agitating station while rotationally driving said rollers in a direction such that the motion of the uppermost portion of each of said rollers is in a direction generally the same as the direction of motion of said container along said path, with the first said roller having a predetermined axis of rotation and a diameter substantially less than the total height of said container as it is supported for movement along said path with said first roller being positioned above said path a height sufficient to prevent said container from passing between said path and said first roller while permitting said container to pass over said first roller, and a second said roller selectively positionable between a container agitating position and a container passing position, with said container agitating position being one in which said second roller is positioned a height above said path sufficient to prevent said container from passing over said adjacent first and second rollers, whereby the action of conveying the container along the path and engaging the first and second rollers in the agitating position will cause the container to roll against the rollers to effect agitation of the container and its contents, and said container passing position being one in which said height of said second roller above said path is reduced sufficiently to permit said container to pass over said first roller and said adjacent second roller, whereby the container will move beyond the container agitating station toward the exit.

2. The method of claim 1 wherein said thermal conditioning fluid contacting step comprises contacting said container with a liquid having a temperature greater than said temperature of said container at said entrance of said process, whereby the container and its contents will be heated by the thermal conditioning liquid.

3. The method of claim 1 wherein said thermal conditioning fluid contacting step comprises contacting said container with a liquid having a temperature less than said temperature of said container at the entrance into said process, whereby the container and its contents will be cooled by the thermal conditioning liquid.

4. The method of claim 1 wherein said thermal conditioning fluid contacting step is effected by spraying said thermal conditioning fluid onto said container.

5. The method of claim 1 wherein the speed of said rotation of said rollers is such that the tangential speed thereof is substantially the same as the speed of movement of said conveying path.

6. The method claim 1 wherein said second roller is mounted for a pivoting movement between said container agitating position and said container passing position with the pivot axis of said pivoting movement being generally adjacent said axis of rotation of said first roller.

7. The method of claim 6 wherein said pivot axis generally coincides with said axis of rotation of first roller.

8. The method of claim 1 wherein said apparatus is agitated at a plurality of said agitating stations interposed between the entrance and the exit of the path along which said containers move.

9. The method of claim 1 further comprising the step of at least partially immersing said container within a bath of said thermal conditioning fluid during said movement of said container between said entrance and said exit.

10. The method of claim 9 wherein said immersion is effected at least at one said agitating station.

11. The method of claim 9 wherein the quantity of said thermal conditioning fluid is sufficient to substantially cover said container.

12. The method claim 1 wherein said container comprises a flexible bag having a leading edge and a predetermined height when carried along said conveying path whereby the action of carrying the bag along the path and engaging the rollers at the agitating station in the agitating position will cause the leading edge of the bag to be lifted by the rollers, causing the bag to roll over on itself and effect a rotation of the bag end over end along with agitation of the material contained within.

13. Apparatus for agitating and thermally conditioning containers, said apparatus including an entrance and an exit and at least one agitating station interposed therebetween, and comprising
   conveying means for carrying said containers from said entrance to said agitating station and from said agitating station to said exit;
   thermal conditioning means for changing the temperature of said container and material contained therewithin by contacting said container with a thermal conditioning fluid having a temperature substantially different from that of said container when engaged by said conveying means at said apparatus entrance to transfer heat between said container and said fluid; and
   agitating means positioned at said agitating station and comprising
      at least two rollers positioned above said conveying means and adjacent one another at said agitating station, said rollers being rotationally driven in a direction such that the motion of the uppermost portion of each of said rollers is in a direction generally the same as the direction of motion of said conveying means, a first said roller having a predetermined axis of rotation and a diameter substantially less than the total height of said container measured above said conveying means, said first roller being positioned above said conveying means a height sufficient to prevent said container from passing between said conveying means and said first roller while permitting said container to pass over said first roller, and;

a second said roller selectively positionable between a container agitating position in which said second roller is positioned a height above said conveying means sufficient to prevent said container from passing over said adjacent first and second rollers, whereby the action of the conveying means and the first and second rollers in the agitating position will cause the container to roll against the conveying means and rollers to effect agitation of the container and its contents, and a container passing position in which said height of said second roller above said conveying means is reduced sufficiently to permit said container to pass over said first roller and said adjacent second roller, whereby the container will move beyond the container agitating station toward the exit.

14. The apparatus of claim 13 wherein said conveying means comprises an endless loop of container supporting structure moving at a substantially constant speed around a fixed path.

15. The apparatus of claim 13 wherein said conveying means includes means for introducing said containers from said entrance onto said endless loop and means for removing said containers from said endless loop.

16. The apparatus of claim 13 wherein said thermal conditioning fluid comprises a liquid having a temperature greater than said temperature of said container when engaged by said conveying means at said apparatus entrance, whereby the container and its contents will be heated by the thermal conditioning liquid.

17. The apparatus of claim 13 wherein said thermal conditioning fluid comprises a liquid having a temperature less than said temperature of said container when engaged by said conveying means at said apparatus entrance, whereby the container and its contents will be cooled by the thermal conditioning liquid.

18. The apparatus of claim 13 wherein said thermal conditioning means comprises means spraying said thermal conditioning fluid onto said container.

19. The apparatus of claim 13 wherein the speed of said rotation of said rollers is such that the tangential speed thereof is substantially the same as the speed of movement of said conveying means.

20. The apparatus of claim 13 further comprising means for supporting said second roller for movement between said container agitating position and said container passing position, said movement comprising pivoting movement about a pivot axis generally adjacent said axis of rotation of said first roller.

21. The apparatus of claim 20 wherein said pivot axis generally coincides with said axis of rotation of said first roller.

22. The apparatus of claim 13 wherein said apparatus includes a plurality of said agitating stations.

23. The apparatus of claim 13 further comprising fluid holding means with at least a portion of said conveying means being positioned within said fluid holding means, said fluid holding means containing a quantity of said thermal conditioning fluid sufficient to at least partially cover said container when said container is on said portion of said conveying means within said fluid holding means.

24. The apparatus of claim 23 wherein said conveying means portion includes at least one said agitating station.

25. The apparatus of claim 23 wherein said thermal conditioning fluid quantity is sufficient to substantially cover said container when said container is on said portion of said conveying means within said fluid holding means, whereby thermal conditioning of the container on that portion of the conveying means is effected by immersion of the container within the thermal conditioning fluid.

26. The apparatus of claim 13 wherein said container comprises a flexible bag having a leading edge and a predetermined height when carried on said conveying means, whereby the action of the conveying means and the rollers in the agitating position will cause the leading edge of the bag to be lifted by the rollers, causing the bag to roll over on itself and effect a rotation of the bag end over end.

* * * * *